United States Patent [19]

Miyawaki et al.

[11] Patent Number: 5,560,554
[45] Date of Patent: Oct. 1, 1996

[54] STATOR WINDING SHAFT WITH STROKE ADJUSTMENT

[75] Inventors: Noburo Miyawaki; Tsutomu Furuya, both of Kanagawa, Japan

[73] Assignee: Odawara Engineering Co., Ltd., Japan

[21] Appl. No.: 183,361

[22] Filed: Jan. 19, 1994

[30] Foreign Application Priority Data

Aug. 31, 1993 [JP] Japan ................................ 5-8618

[51] Int. Cl.⁶ .................................................. H02K 15/02
[52] U.S. Cl. ............................................................ 242/432.4
[58] Field of Search ............................ 242/1.1 R, 1.1 A, 242/1.1 E; 29/5.96, 605

[56] References Cited

U.S. PATENT DOCUMENTS

| | | | |
|---|---|---|---|
| 3,129,499 | 4/1964 | Greene | 29/205 |
| 3,677,480 | 7/1972 | Schanke | 242/1.1 R |
| 3,785,212 | 1/1974 | Eminger | 74/23 |
| 3,822,830 | 7/1974 | Peters | 242/1.1 R |
| 4,858,835 | 8/1989 | Luciani et al. | 242/1.1 A |
| 4,991,782 | 2/1991 | Luciani | 242/1.1 R |
| 5,186,405 | 2/1993 | Beakes et al. | 242/1.1 R |
| 5,273,223 | 12/1993 | Tsugawa | 242/1.1 R |
| 5,362,005 | 11/1994 | Santandrea | 242/1.1 R |
| 5,370,324 | 12/1994 | Beakes et al. | 242/1.1 R |

*Primary Examiner*—Katherine Matecki
*Attorney, Agent, or Firm*—Thompson Hine & Flory P.L.L.

[57] ABSTRACT

A stator winding apparatus includes devices for adjustment of the pivot of the needle and of the stroke of the needle. The apparatus includes a winding shaft assembly which includes a drive shaft, a second shaft which reciprocates linearly in response to rotation of the drive shaft, and a third shaft in which said second shaft is coaxially received. A crank shaft is coupled by an adjustable coupling to the drive shaft and the second shaft to adjust the stroke of the second shaft. Reciprocation of the second shaft causes the needle to pivot radially inwardly and outwardly.

17 Claims, 7 Drawing Sheets

5,560,554

STATOR WINDING SHAFT WITH STROKE ADJUSTMENT

BACKGROUND OF THE INVENTION

This invention relates to a stator winding apparatus having an unique method for adjusting the stroke and pivot of a stator winding needle.

SUMMARY OF THE INVENTION

The invention is directed to a stator winding apparatus having an automatic needle pivot adjustment device and an automatic needle stroke changing device.

The winding shaft assembly includes three shaft sections and a threaded coupling. Two of the shaft sections are concentric and joined to the first section by the threaded coupling.

To adjust the pivot of the needle the first section of the shaft rotates in the threaded coupling and causes a second section of shaft to move in the same linear direction. Rotation of the first portion of the shaft in a first direction in the threaded coupling causes the second section of the internal shaft to be advanced linearly. Rotation of the first section in the opposite direction in the threaded coupling causes the second shaft section to retract. Thus, the extent to which the needle pivots outside of the winding head is controlled by the rotation of the first shaft in the threaded coupling.

The winding apparatus also includes a crankshaft mechanism which is journaled to a main drive shaft at one end and to the threaded coupling at its second end. Thus, adjustment of the stroke of the crankshaft either lengthens or shortens the stroke of the winding head. In order to adjust the crankshaft, the main drive shaft must first be locked into a stationary position. A cam follower and a fixing head, which engages the main drive shaft, prevent motion of the drive shaft during adjustment of the crankshaft stroke. A socket drive which engages a socket on an adjustment knob adjusts the stroke of the crankshaft. The rotation of the socket drive in a first direction causes the stroke of the crankshaft to lengthen and rotation of the socket drive in a second direction causes a decrease in the crankshaft stroke.

DETAILED DESCRIPTION

Figure 1:
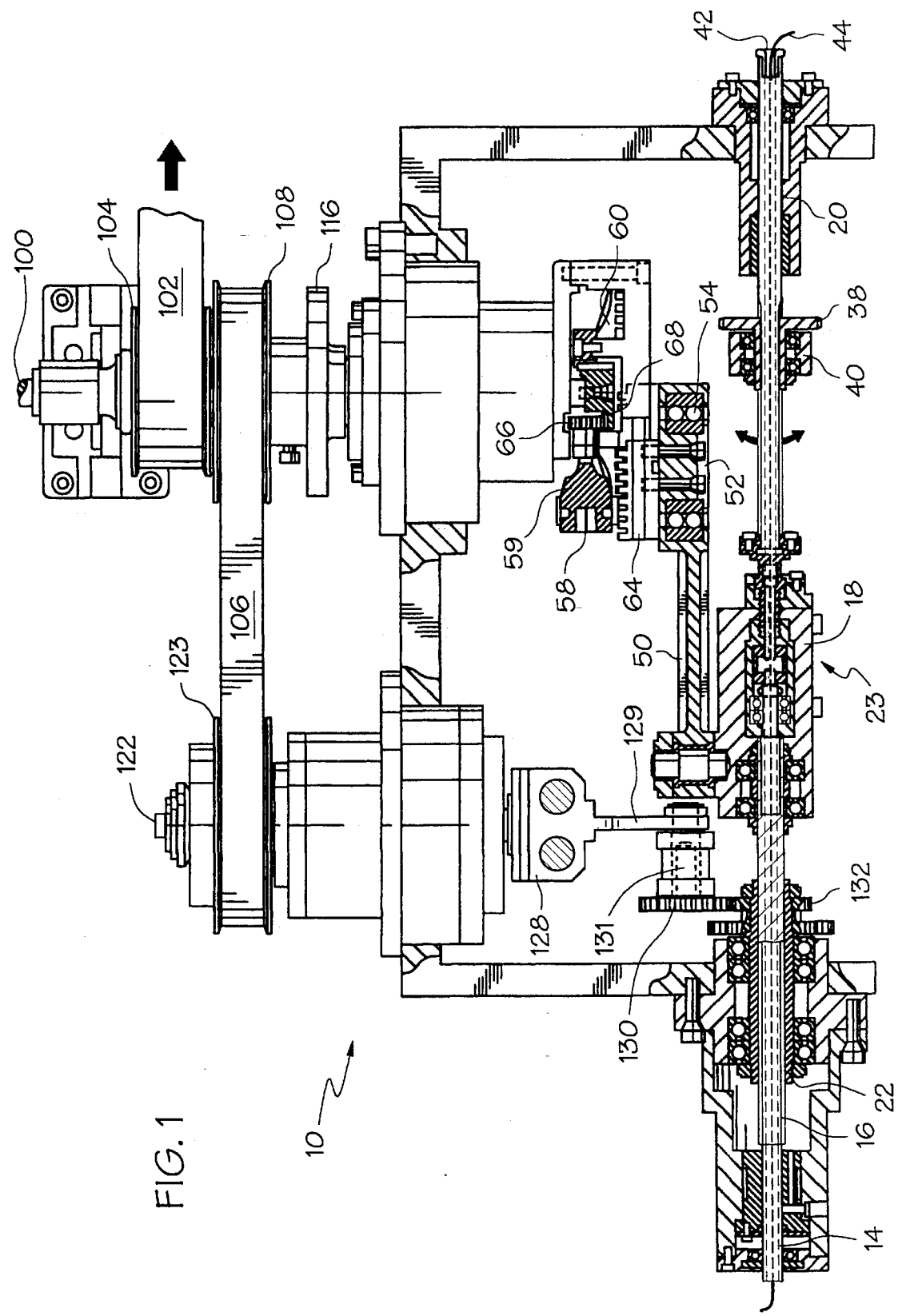
FIG. 1 presents an elevational view of the stator winding apparatus.

FIG. 1 is an elevational view of a stator winding apparatus 10. The apparatus 10 can be divided into three primary functional areas. The first area concerns the outer drive shaft and the method for controlling the pivot of the stator winding needle, i.e., the angular movement of the needle within the stator. The second area includes the drive shaft and crankshaft which control the reciprocation of the winding head. The third area concerns that portion of the apparatus which controls the oscillation of the winding head.

As seen in FIG. 1, the winding apparatus 10 includes a winding shaft assembly 23 including three shaft sections and a threaded coupling. The first shaft section 20, into which the winding wire 44 is fed, is coupled to slide coupling 18, which is depicted in detail in FIG. 6. Both second shaft section 14 and third shaft section 16 are coupled to slide coupling 18 at the side opposite that which is coupled to first shaft section 20. Shaft section 16 is partially splined and also hollow being concentric with shaft section 14. At its end opposite slide coupling 18, shaft section 16 connects with winding head 200. Shaft section 16 is partially splined so that it can mesh with sleeve 22, the action of which will be described below.

The wire 44 to be wound onto the stator is fed into feed 42. The wire 44 can be delivered from any conventional source, such as a spool. The wire 44 travels up first shaft section 20, through the slide coupling 18, into second shaft section 14 and out shaft 14 to the needle 216 (FIG. 4) for winding onto a stator. The second shaft section 14 reciprocates within third shaft section 16. The winding needle 216 is pivoted by means of the motion of the second shaft section 14 in conjunction with slide coupling 18 as explained later. The winding head 200 is reciprocated by the action of third shaft section 16, as is also explained later.

Figure 6:
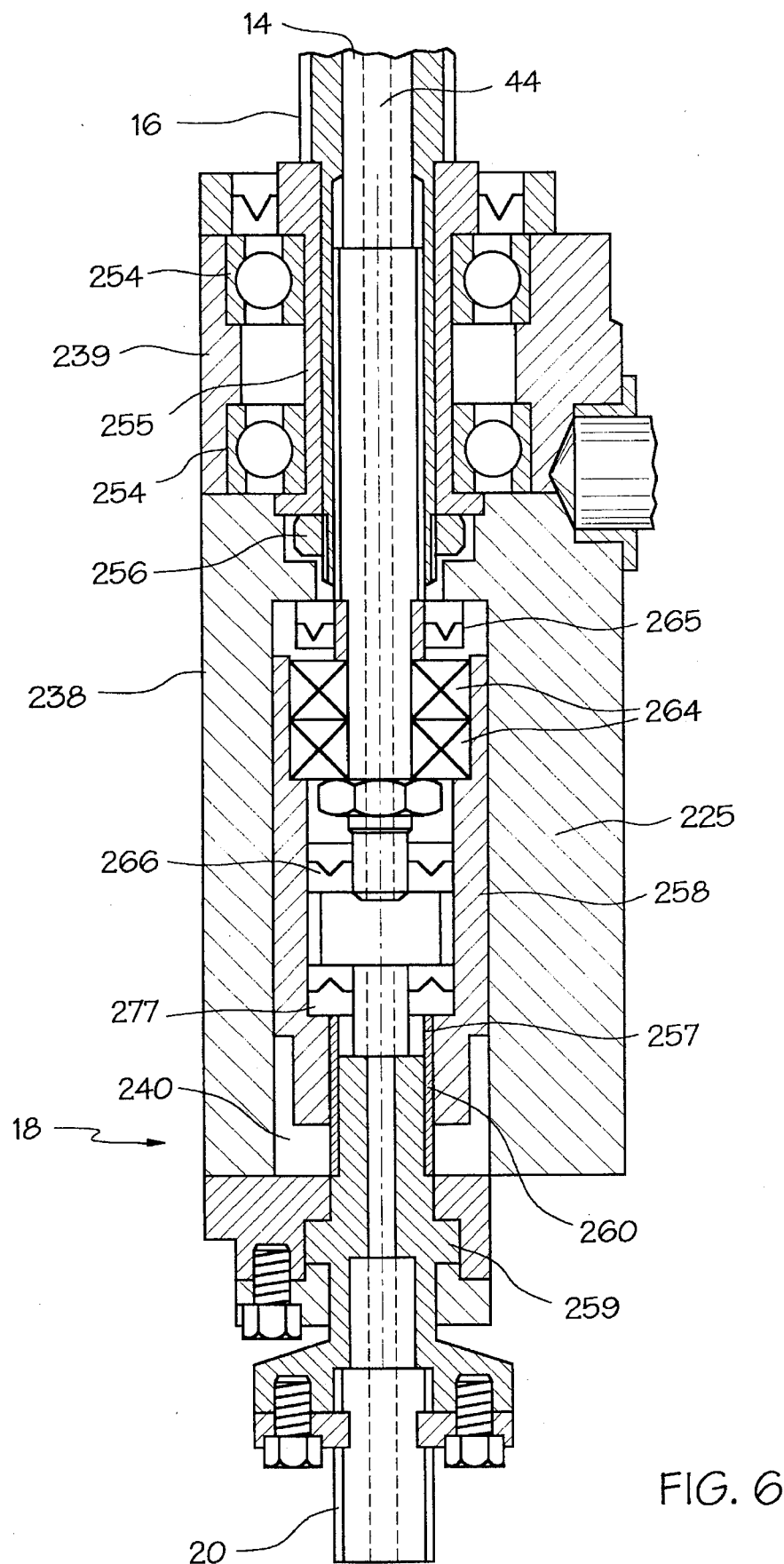
FIG. 6 presents a detailed view of the slide coupling of the stator winding apparatus.

As shown in FIG. 6, first shaft section 20 is coupled to slide coupling 18 by coupling 259. Slide coupling 18 includes channel 240 in which slidable connecting member 258 moves. One end of shaft section 20 includes threads 260 which mate with threads 257 on slidable connecting member 258. Shaft section 14 is coupled to slidable connecting member 258 by a pair of bearings 264. Slide coupling 18 also includes bearing elements 254 which permit shaft section 14 to rotate in relation to shaft section 16 in slide coupling 18.

Motor 150 drives crankshaft 50 by means of drive shaft 100. Belt drive pulley 104 is mounted on drive shaft 100. Belt 102 connects belt drive pulley 104 to belt drive pulley 154. Belt drive pulley 154 is rotated by shaft 152 which is connected to motor 150. Belt drive pulley 108 is positioned beneath belt drive pulley 104 on drive shaft 100. Belt 106 connects belt drive pulley 108 to belt drive pulley 123.

The winding shaft assembly is reciprocated by crankshaft 50 which is journaled, at one end, to eventable 52 by bearings 54 and, at a second end, to slide coupling 18. Geared slider 64 is mounted on eventable 52 and engages bevel gear 60. Bevel gear 60 engages socket gear 66. Socket gear 66 normally engages flange 68 to lock socket gear 66 and bevel gear 60, and subsequently crankshaft 50, in position while crankshaft 50 is in operation. A spring means (not shown) causes flange 68 to engage fixing gear 66. The spring means also engages lock shaft 101 to maintain it in a locked position. Gear 66 is connected to adjustment knob 59, which contains square socket 58. Adjustment knob 59 rotates to adjust the position of bevel gear 60 in relation to slider block 64 and thereby changes the radius of crankshaft 50.

Figure 2:
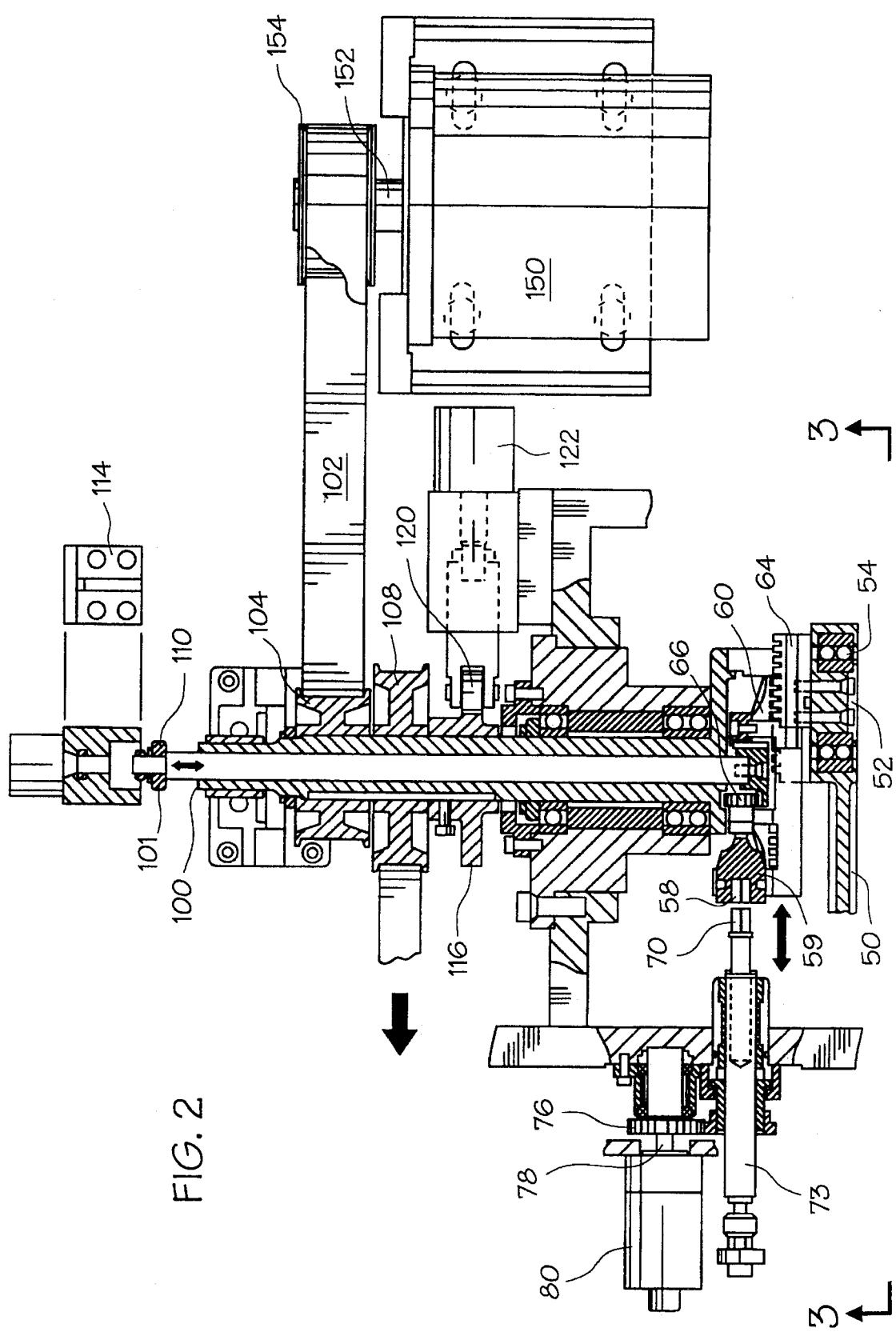
FIG. 2 presents a cross-sectional view of the adjustment mechanism for the adjustment of the stroke of the crankshaft.
Figure 7:
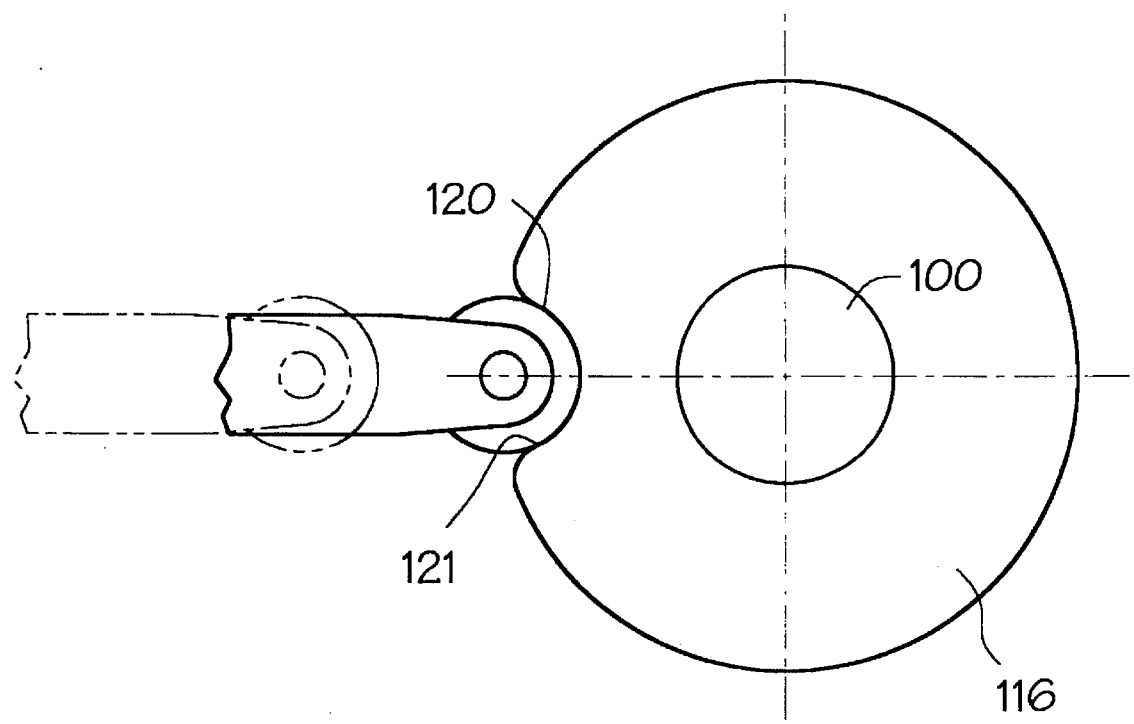
FIG. 7 presents an elevational view of the locking flange of the crankshaft adjustment mechanism.

FIG. 2 presents a view of the crankshaft adjustment mechanism. The crankshaft adjustment portion of the apparatus 10 includes drive shaft 100, eventable 52 and crankshaft 50. To provide for proper adjustment of the stroke of the crankshaft 50, the crankshaft 50 must remain stationary during the adjustment process. This is accomplished by means, of a locking shaft 101, which is positioned in a longitudinal cavity in the main drive shaft 100, and a locking flange 116 positioned on the outside of drive shaft 100. The locking shaft 101 acts to disengage the eventable 52 from conjunction with the main drive shaft 100. Locking shaft 101 terminates in an enlarged drive shaft head 110 at one end. At the end opposite drive shaft head 110, drive shaft 100 is journaled to slider block 64 which, in turn, is journaled to crankshaft 50. Locking flange 116 is mounted on drive shaft 100 beneath pulley 108. Locking flange 116 includes a semicircular cutout 121 shown in FIG. 7, into which cam follower 120 may be inserted. Cam follower 120 is extended onto the periphery of locking flange 116 and into semicircular cutout 121 by means of air cylinder 122.

Motor 150 rotates both drive shaft 100 and drive shaft 122. Motor 150 rotates shaft 152 which causes pulley 154 to rotate. Pulley 154 causes pulley 104 to rotate by means of belt drive 102. This in turn causes crankshaft 50 to rotate and provide the reciprocal motion of winding head 200. The rotation of drive shaft 100 also causes pulley 108 to rotate. Pulley 108 in turn drives pulley 123 on drive shaft 122 by means of belt drive 106. This in turn results in the rotation of gear 132 which causes winding head 200 to angularly oscillate. A description of the complete mechanism which causes the angular oscillation of winding head 200 is provided below.

Figure 8:
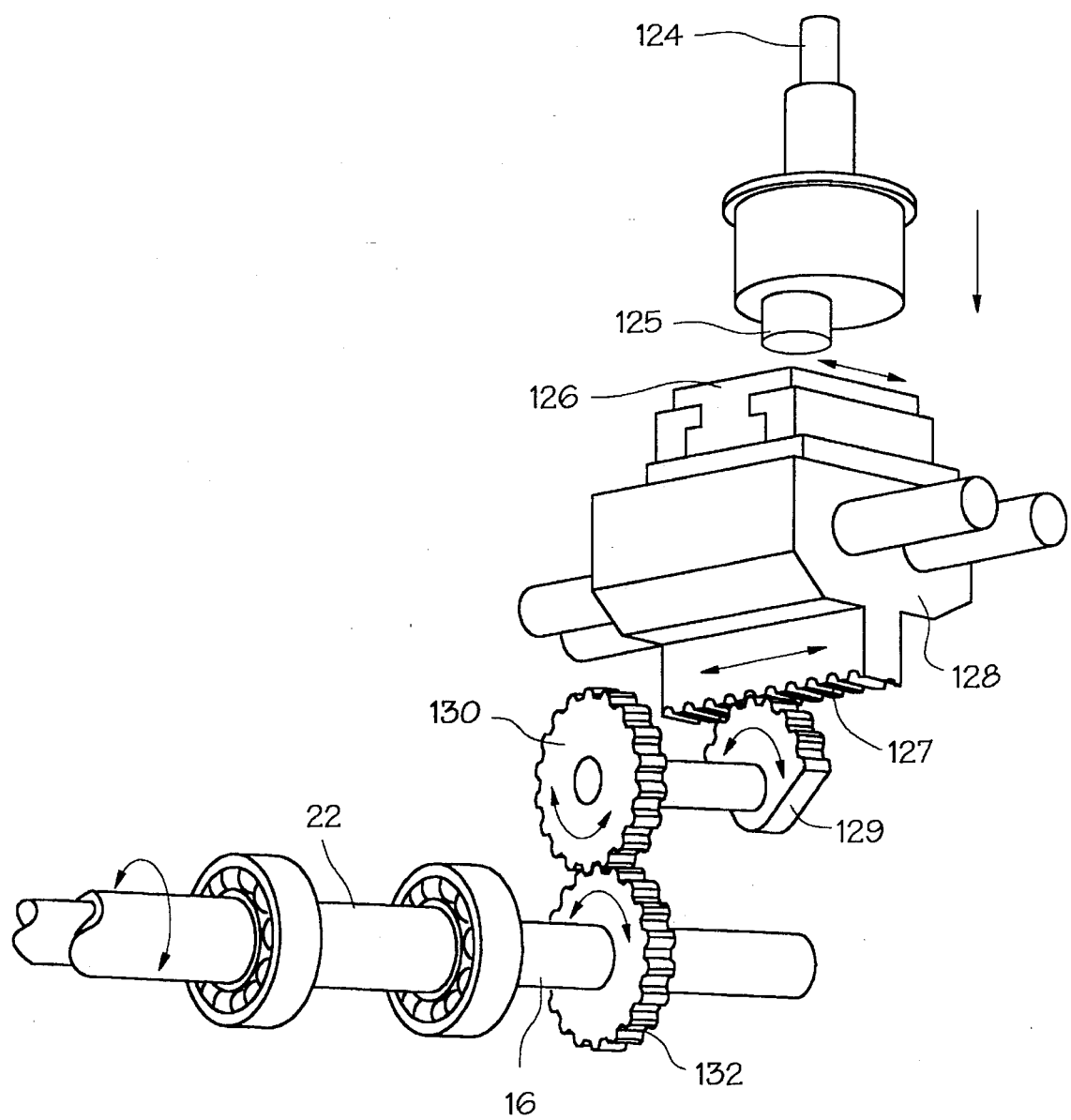
FIG. 8 presents a detailed view of the winding shaft rotational motion mechanism.

Belt 106 from drive shaft 100 drives pulley 123 which, as shown in FIG. 1, drives a gear train which includes a pinion gear 124 having a boss 125 eccentrically mounted at the back thereof. This gear mechanism is shown in more detail in FIG. 8. Boss 125 is coupled with cubic slider 126. The orbit of boss 125 causes the slider to reciprocate in one direction while the slide 128 reciprocates orthogonally thereto. Slide 128 carries a rack 127 which meshes with sector gear 129 on shaft 131 and drives gear 130, which meshes with gear 132 so as to oscillate the shaft 16 angularly.

Figure 5:
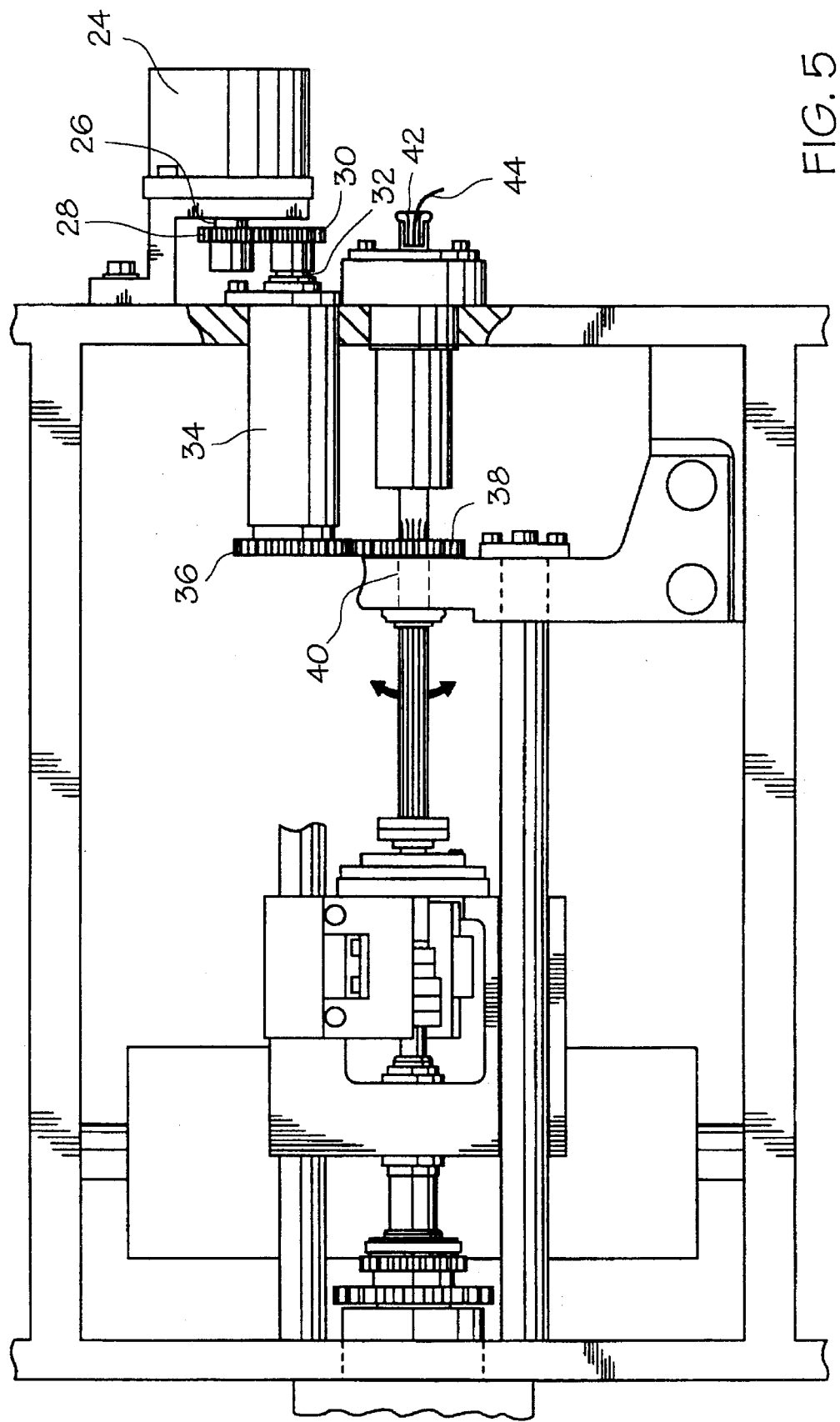
FIG. 5 is a plan view of the shaft oscillation mechanism of the stator winding apparatus.

FIG. 5 presents a plan view of the needle pivot adjustment mechanism of the stator winding apparatus 10. Stationary mount 40 retains gear 38 which is journaled to section 22 of the internal shaft 23. Gear 38 engages gear 36 which is mounted on drive shaft 32. Gear cylinder 34 surrounds shaft 32 which terminates at the end opposite gear 36 in gear 30. Gear 30 in turn engages gear 28. Gear 28 is connected to drive shaft 26 which is driven by servo motor 24 to cause shaft section 20 to rotationally oscillate. Gear 38 rotates shaft section 20 in a first direction such that coupling 259 rotates. As coupling 259 rotates, threads 260 cause threads 257 to move connecting member 258 toward the top of FIG. 6. Connecting member 258 then forces second shaft section 14 to extend upward by means of bearings 264. As shaft section 20 rotates in the opposite direction, coupling 259 rotates threads 260 causing threads 257 to move connecting member 258 down toward the bottom of FIG. 6. Connecting member 258 then retracts shaft section 14 downward. The extension and retraction of shaft section 14 pivots winding needle 216 as described below.

Figure 4:
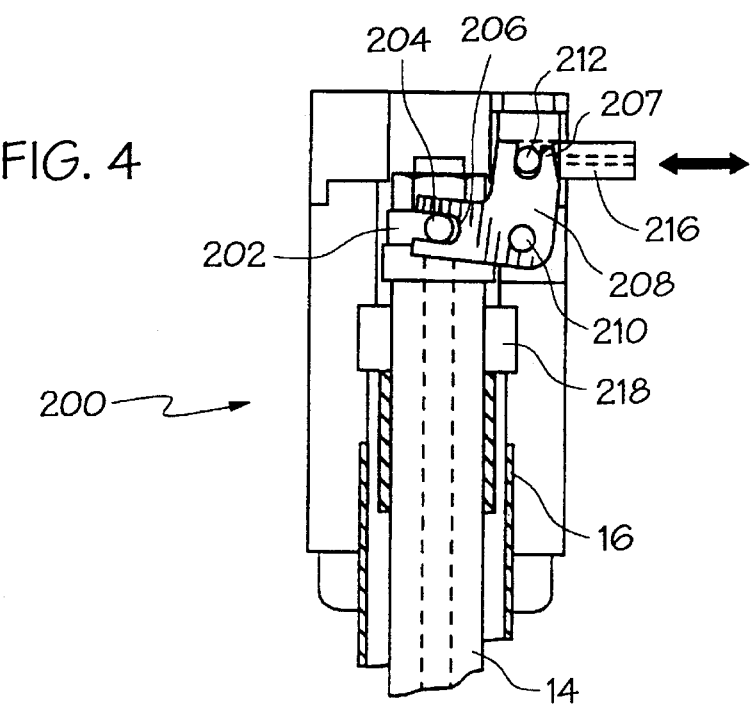
FIG. 4 presents a partial cross-sectional view of the winding head.

FIG. 4 presents a cross-sectional view of the winding head 200. Shaft section 14 terminates in end 202 having an internal shaft connector post 204 which is slidably mounted between the prongs of U-shaped terminus 206 in L-shaped link 208. At the other end of the L-shaped link 208, second U-shaped terminus 207 slidably engages post 212 on hollow winding needle 216. Link 208 pivots about point 210. As shown in FIG. 5, the winding needle 216 is reciprocated, extended and retracted from the winding head 200, by link 208 as the second shaft 14 is reciprocated by motor 24. Also in winding head 250, shaft section 16 is journaled to winding head 200 by connector 218.

The primary stator winding motion of winding head 200 is provided by crankshaft 50. Main drive shaft 100 rotates crankshaft 50 by means of eventable 52. Eventable 52 causes crankshaft 50 to rotate causing slidable coupling 18 to reciprocate linearly. Because shaft section 16 is journaled to slidable coupling 18, shaft section 16 also reciprocates linearly. The linear motion of shaft section 16 is translated to winding head 200 through connector 218. This causes winding head 200, i.e., shaft section 14 and the winding needle 216 with their associated linkage, to reciprocate.

To pivot the needle 216, second shaft section 14 is reciprocated. Shaft section 20 is rotated by gear 38 which in turn is driven by servo motor 24. Upon rotation of shaft section 20 in a first direction in the slide coupling 18, second shaft section 14 is advanced linearly. Advancement of shaft section 14 in a forward direction causes needle 216 to extend away from winding head 200. Shaft section 14 causes post 204 to force U-shaped terminus 206 forward. As U-shaped terminus 206 moves forward, L-shaped link 208 is pivoted about point 210 causing needle 216 to be extended away from the winding head. Needle 216 is retracted back toward winding head 200 when shaft section 14 is retracted by the reverse motion of shaft section 20 in slide coupling 18. As shaft section 14 retracts, it pulls. U-shaped terminus 206 with it causing L-shaped link 208 to pivot about point 210 in the opposite direction. Thus, needle 216 is retracted back toward winding head 200 when U-shaped terminus 206 is pulled.

As the winding needle is pivoted, shaft section 16 is rotated by gear 132. Pulley 128, which is indirectly driven by motor 150, drives a gear train which translates the rotary movement of drive shaft 122 to the linear movement of rack 127. This gear train includes pinion gear 124 rotates around the inner periphery of an internal circular gear (not shown). The rotation of pinion gear 124 and the eccentric placement of boss 125 on pinion gear 124 causes boss 125 to have an eccentric orbit. Cubic slider 126 translates the eccentric orbit of boss 125 into the forward and backward motion of slider 128. Rack 127 on slider 128 causes a similar motion in sector gear 129. Motion of sector gear 129 in a first direction causes gear 130 to rotate in the same direction. Gear 130 then causes gear 132 to rotate in the opposite direction. As gear 132 rotates, sleeve 22 rotates shaft section 16 causing the winding head 200 to rotate in a first direction. As sector gear 129 rotates in a second direction, gear 130 rotates in the same direction as sector gear 129. This in turn causes gear 132 and, subsequently, sleeve 22 to rotate shaft section 16 in a second, opposite direction. Rotation of shaft section 16 in this second direction causes winding head 200 to rotate in the second, opposite direction.

Figure 3:
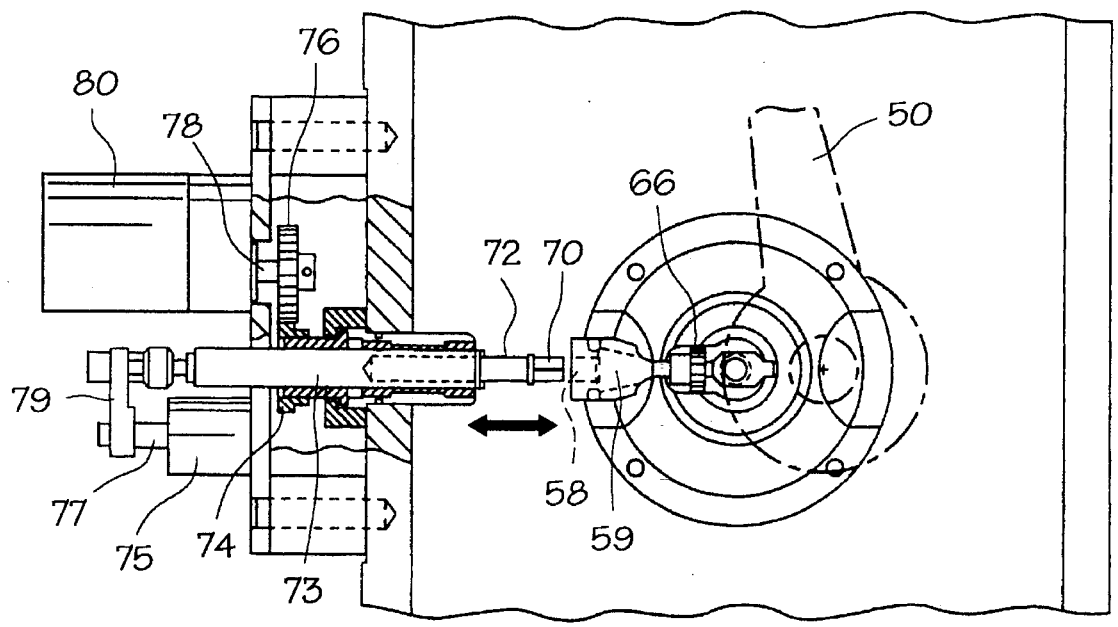
FIG. 3 presents a plan view of the crankshaft adjustment mechanism.

FIG. 3 illustrates a plan view of the crankshaft adjustment mechanism. To change the stroke of crankshaft 50, socket drive 70 is advanced into socket 58 in adjustment knob 59 by air cylinder 75 via linkage 77, 79. Engaging shaft 72 extends socket drive 70 into socket 58. Engaging shaft 72 terminates at the end opposite the socket drive 70 in drive shaft 73. Drive shaft 73 is attached to air cylinder shaft 77 by the bridging element 79. Gear 74 is mounted on drive shaft. 73 of socket drive 70. Gear 74 engages gear 76 which is mounted on drive shaft 78. Drive shaft 78 extends from servo motor 80. Servo motor 80 then drives adjustment knob 59 to adjust the stroke of crankshaft 50.

Air cylinder 75 moves socket drive 70, which engages socket 58 of adjustment knob 59, to adjust the stroke of crankshaft 50. Air cylinder 75 draws adjustment cylinder 77 such that socket drive 70 engages the socket 58 of the adjustment knob 59. Once in place on the square socket 58, gear 76 causes gear 74 to rotate socket drive 70. Servo motor 80 causes shaft 78 and, subsequently, gear 76 to rotate. Rotation of socket drive 70 in a first direction causes a lengthening in the stroke of crankshaft 50 and rotation of socket drive 70 in a second direction causes a decrease in the stroke of crankshaft 50. Rotation of socket drive 70 causes scrolled bevel gear 60 to rotate with respect to slider block 64 thereby moving bevel gear 60 along slider block 64 causing the change in the radius of crankshaft 50.

In order to adjust the stroke of the crankshaft 50, drive shaft 100 must be held in a stationary position. Two means are provided to prevent drive shaft 100 from rotating during the adjustment of crankshaft 50. First, the drive shaft 100 is held immobile when cam follower 120 engages semicircular cutout portion 117 of flange 116. Air cylinder 122 extends cam follower 120 onto the periphery of flange 116. Drive shaft 100 is rotated until cam follower 120 engages the semicircular cutout portion of flange 116. As the radius of crankshaft 50 is being adjusted, cam follower 120 remains in position in semicircular cutout 117. Upon completion of the adjustment process, air cylinder 122 removes cam follower 120 from semicircular cutout 117 which allows drive shaft 100 to resume rotation, if fixing head 114 has also been removed from drive shaft 50.

Fixing head 114 provides the second means to prevent motion of drive shaft 100 during adjustment of crankshaft 50. Fixing head 114 engages enlarged head 110 of lock shaft 101. Fixing head 114 applies a downward force on lock shaft 101 causing the spring means to be depressed which then disengages toothed flange 68 from gear 66. While toothed flange 68 engages gear 66, socket drive 70 cannot rotate adjustment knob 59. Furthermore, as long as toothed flange 68 engages gear 66, main drive shaft 100 can rotate crankshaft 50. When disengaged from gear 66, main drive shaft 100 no longer connects to crankshaft 50, thus preventing crankshaft 50 from rotating during the adjustment process. When the adjustment of crankshaft 50 is completed, fixing head 114 is withdrawn from enlarged head 110. The spring means then applies an upward force on locking shaft 101 causing flange 68 to re-engage gear 66. Once flange 68 re-engages gear 66 and cam follower 120 is removed from semicircular cutout 117, then drive shaft 50 can resume operation.

The preceding description has been presented with reference to a presently preferred embodiment of the invention as shown in the drawings. Persons skilled in the art and technology to which this invention pertains will appreciate that alterations and changes in the described structure can be practiced without departing from the spirit, principles and scope of this invention.

What is claimed is:

1. An apparatus for winding a stator comprising:

a winding needle pivotally mounted in a winding head and a winding shaft assembly, said winding shaft assembly including a first shaft, a second shaft which reciprocates linearly in response to rotation of said first shaft and having said winding needle linked to one end thereof, and a third shaft having said second shaft coaxially received therein and being connected to said winding head, said first shaft being journalled to said second shaft by a slide coupling such that rotation of said first shaft in one direction moves said second shaft in a first linear direction within said third shaft and rotation of said first shaft in a second direction moves said second shaft in a second linear direction opposite said first direction, said winding needle being linked to said second shaft by a linkage such that reciprocation of said second shaft causes said needle to pivot radially inwardly and outwardly; and rotation of said third shaft angularly oscillates said winding head causing said winding needle to angularly oscillate.

2. The apparatus of claim 1 wherein said linkage between said winding needle and said second shaft is an L-shaped linkage.

3. The apparatus of claim 2 wherein said first shaft is rotated by a servo motor.

4. The apparatus of claim 3 wherein said third shaft is rotated via a gear train including a sector gear and a rack.

5. An apparatus for linearly reciprocating a winding needle comprising:

a drive shaft;

a winding needle;

a winding shaft linked to said winding needle;

a crankshaft coupled, at a first end, to said drive shaft, and coupled at a second end, to said winding shaft, said crankshaft being coupled to said drive shaft by a scroll gear and slider block;

wherein rotation of said drive shaft causes said crankshaft to reciprocate the winding shaft linearly and the length of the stroke of said crankshaft adjustable by moving the scroll gear and the slider block.

6. The apparatus of claim 5 wherein the apparatus includes a socket drive for rotating said scroll gear with respect to said slider block and thereby adjusting the length of said crankshaft.

7. The apparatus of claim 5 wherein said scroll gear is provided with a bevel gear on one side thereof and said socket drive rotates said bevel gear to thereby adjust the length of said crankshaft.

8. The apparatus of claim 7 wherein said apparatus further includes a locking mechanism for locking the drive shaft in a position in alignment with said socket drive when said crankshaft is adjusted.

9. The apparatus of claim 8 wherein said scroll gear is locked with respect to said drive shaft when said winding shaft is reciprocated.

10. An apparatus for linearly reciprocating a winding needle comprising:

a drive shaft;

a winding needle;

a winding shaft linked to said winding needle;

a crank shaft coupled, at a first end, to said drive shaft by an adjustable coupling and coupled, at a second end, to said winding shaft;

wherein rotation of said drive shaft causes said crank shaft to reciprocate the winding shaft linearly and the length of the stroke of said crank shaft is adjustable by the adjustable coupling.

11. An apparatus for winding a stator comprising:

a drive shaft;

a crank shaft having an adjustable stroke length coupled to said drive shaft;

a winding head;

a winding shaft assembly journalled to said crank shaft, said winding shaft assembly including a first shaft, a second shaft which reciprocates linearly in response to rotation of said first shaft and having said winding needle linked to one end thereof, and a third shaft having said second shaft coaxially received therein, said third shaft being coupled to said winding head such that rotation of said third shaft angularly oscillates said winding head, said first shaft being journalled to said second shaft by a slide coupling such that rotation of said first shaft in a first direction moves said second shaft in a first linear direction within said third shaft and rotation of said first shaft in a second direction moves said second shaft in a second linear direction opposite said first linear direction; and a winding needle mounted for reciprocation in said winding head, said winding needle linked to said second shaft by an L-shaped linkage such that reciprocation of said second shaft causes said needle to pivot radially inwardly and outwardly.

12. The apparatus of claim 11 wherein said crankshaft is journaled to said drive shaft by a scroll gear and slider block.

13. The apparatus of claim 12 wherein said apparatus includes a socket drive for rotating said scroll gear with respect to said slider block and thereby adjusting the length of said crankshaft.

14. The apparatus of claim 13 wherein said scroll gear includes a bevel gear on one side thereof and said bevel gear is acted upon by said socket drive to adjust the length of said crankshaft.

15. The apparatus of claim 14 wherein said apparatus further includes a locking mechanism for locking said drive shaft in a position in alignment with said socket drive when the length of said crankshaft is adjusted.

16. The apparatus of claim 11 wherein said first shaft is rotated by a servo motor.

17. The apparatus of claim 16 wherein said third shaft is rotated via a gear train including a slide carrying a rack which meshes with a sector gear.

* * * * *

UNITED STATES PATENT AND TRADEMARK OFFICE
CERTIFICATE OF CORRECTION

PATENT NO. : 5,560,554
DATED : October 1, 1996
INVENTOR(S) : Norburo Miyawaki et al.

It is certified that error appears in the above-indentified patent and that said Letters Patent is hereby corrected as shown below:

In claim 5, col. 6, line 34, "crankshaft adjustable" should be --crankshaft is adjustable--.

Signed and Sealed this

Twenty-sixth Day of November 1996

Attest:

BRUCE LEHMAN

*Attesting Officer*  *Commissioner of Patents and Trademarks*